US006443227B1

(12) United States Patent
Hocking et al.

(10) Patent No.: US 6,443,227 B1
(45) Date of Patent: *Sep. 3, 2002

(54) AZIMUTH CONTROL OF HYDRAULIC VERTICAL FRACTURES IN UNCONSOLIDATED AND WEAKLY CEMENTED SOILS AND SEDIMENTS

(75) Inventors: Grant Hocking, Alpharetta; Samuel L. Wells, Lawrenceville, both of GA (US)

(73) Assignee: Golder Sierra LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/721,455

(22) Filed: Nov. 22, 2000

Related U.S. Application Data

(63) Continuation of application No. 09/193,784, filed on Nov. 17, 1998, now Pat. No. 6,216,783.

(51) Int. Cl.[7] ........................ E21B 43/26; E21B 43/267
(52) U.S. Cl. ................... 166/250.1; 166/298; 166/308; 405/129.4
(58) Field of Search ................. 166/280–283, 166/298, 308, 376, 250.1, 305.1; 405/128.15, 128.45, 128.5, 128.7, 128.75, 129.1, 129.35, 129.4, 129.45, 258.1, 263, 266, 269, 270

(56) References Cited

U.S. PATENT DOCUMENTS

| | | | | |
|---|---|---|---|---|
| 2,642,142 A | * | 6/1953 | Clark | 166/281 |
| 3,058,730 A | * | 10/1962 | Bays | 299/4 |
| 3,280,913 A | * | 10/1966 | Smith | 166/308 |
| 3,727,688 A | * | 4/1973 | Clampitt | 166/308 |
| 3,779,915 A | * | 12/1973 | Kucera | 166/282 |
| 3,948,325 A | * | 4/1976 | Winston et al. | 166/308 |
| 4,271,696 A | | 6/1981 | Wood | |
| 4,281,713 A | | 8/1981 | Wood et al. | |
| 4,353,244 A | | 10/1982 | Wood | |
| 4,429,647 A | | 2/1984 | Zinck | |
| 4,790,688 A | * | 12/1988 | Castor | 405/129.4 |
| 5,032,042 A | | 7/1991 | Schuring et al. | |
| 5,061,119 A | | 10/1991 | Balthaus et al. | |
| 5,103,911 A | | 4/1992 | Heijnen | |
| 5,133,625 A | | 7/1992 | Albergo et al. | |
| 5,183,109 A | * | 2/1993 | Poulsen | 166/250.1 |
| 5,263,795 A | | 11/1993 | Corey et al. | |
| 5,322,126 A | * | 6/1994 | Scott, III | 166/308 |
| 5,981,447 A | * | 11/1999 | Chang et al. | 166/308 |
| 6,216,783 B1 | * | 4/2001 | Hocking et al. | 166/250.1 |

FOREIGN PATENT DOCUMENTS

| | | |
|---|---|---|
| DE | 1 934 170 | 1/1971 |
| DE | 40 22 897 A1 | 1/1992 |

* cited by examiner

Primary Examiner—David Bagnell
Assistant Examiner—Sunil Singh
(74) Attorney, Agent, or Firm—Smith, Gambrell & Russell, LLP; Dale Lischer; Eric J. Hanson

(57) ABSTRACT

A method and apparatus for initiating an azimuth controlled vertical hydraulic fracture in unconsolidated and weakly cemented soils and sediments using active resistivity to monitor and control the fracture initiation and propagation. Separate or overlapping treatment walls and containment barriers can be created by controlling and monitoring the propagation of fractures in the subsurface. A fracture fluid is injected into a well bore to initiate and propagate a vertical azimuth controlled fracture. The fracture fluid is energized to conduct electrical current while the fracture propagates through the ground. A series of electrical resistivity monitors measure the electrical conductivity of the fracture fluid in real time against the background conductivity of the formation. Using a series of incremental influence functions, the azimuth of the vertical fracture can be controlled by regulating the injection of fracture fluid based upon the induced voltage of the earth and the conductivity of the fluid in the fracture.

14 Claims, 12 Drawing Sheets

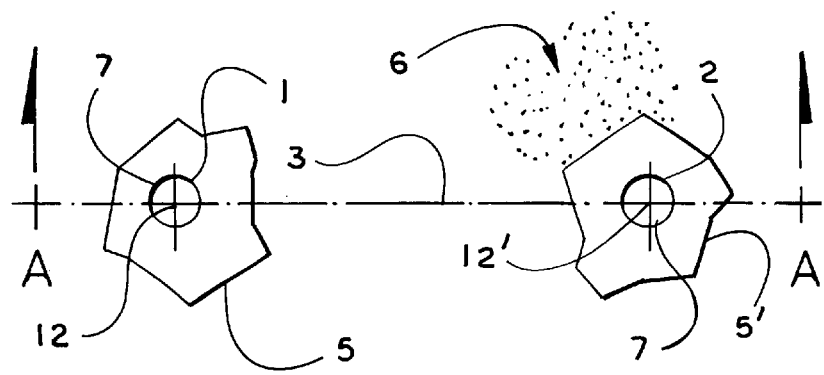
Fig_1
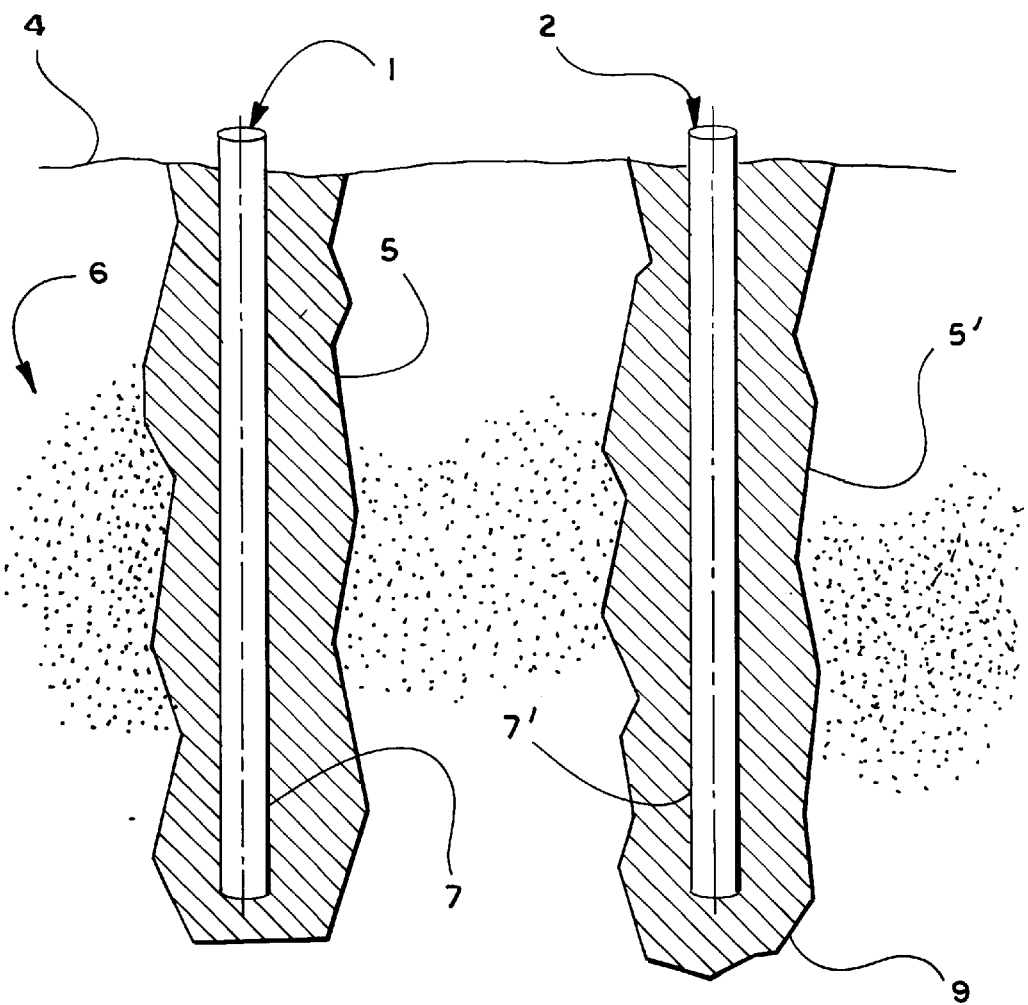
Fig_2 SECTION A-A

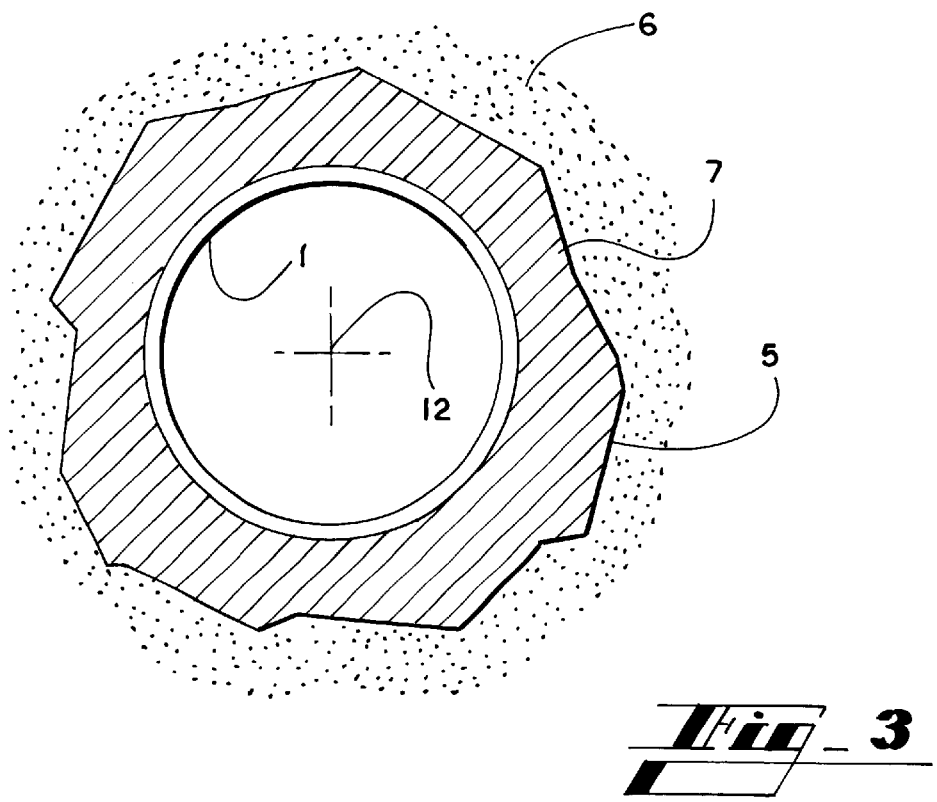
Fig_3
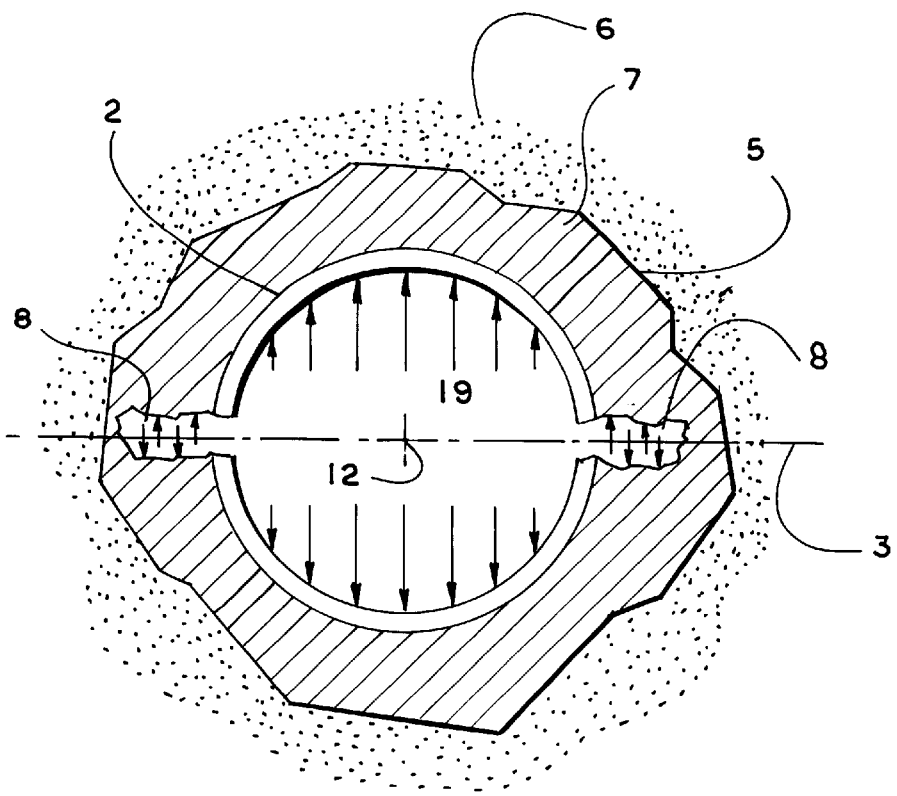
Fig_4

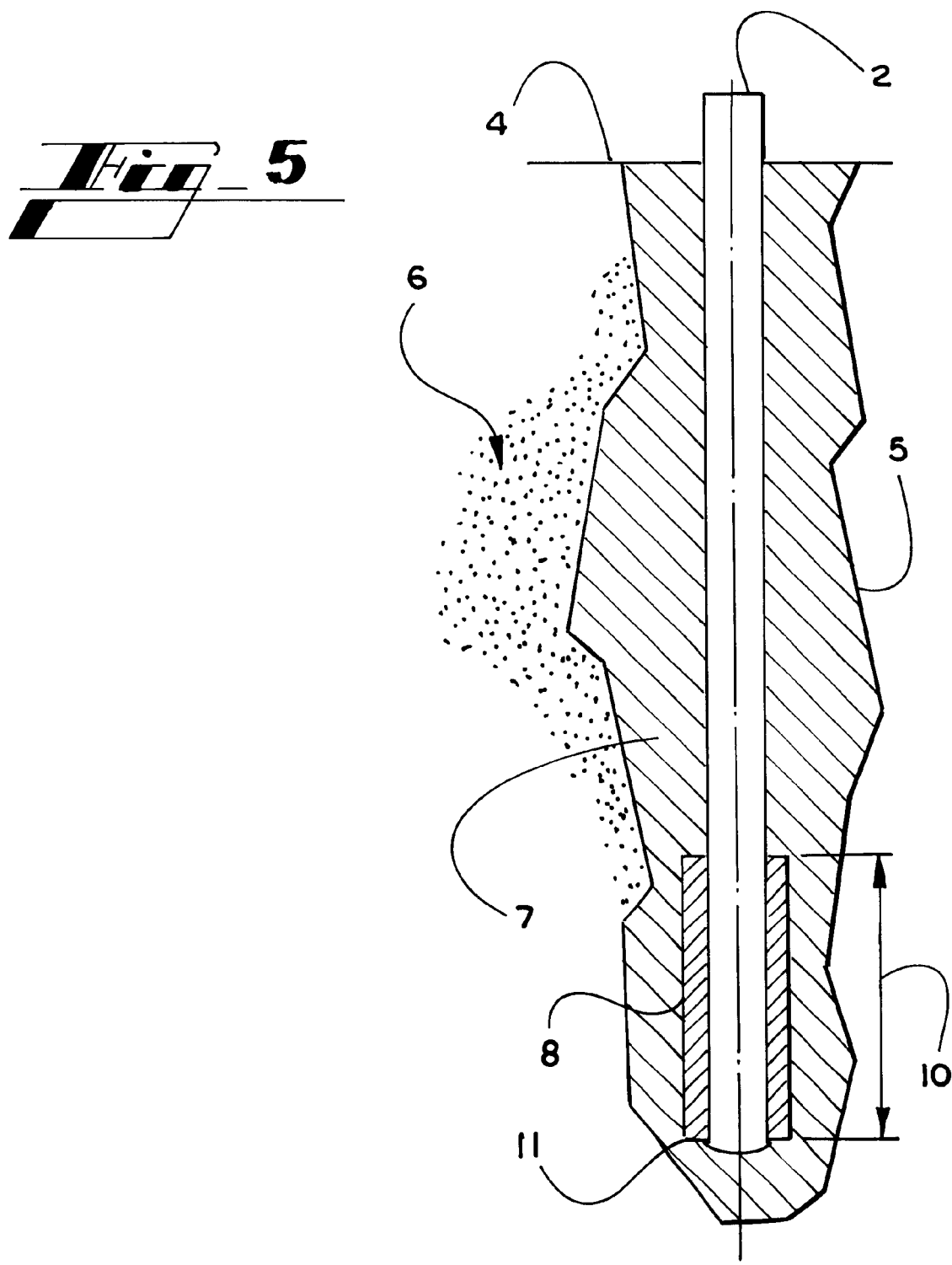

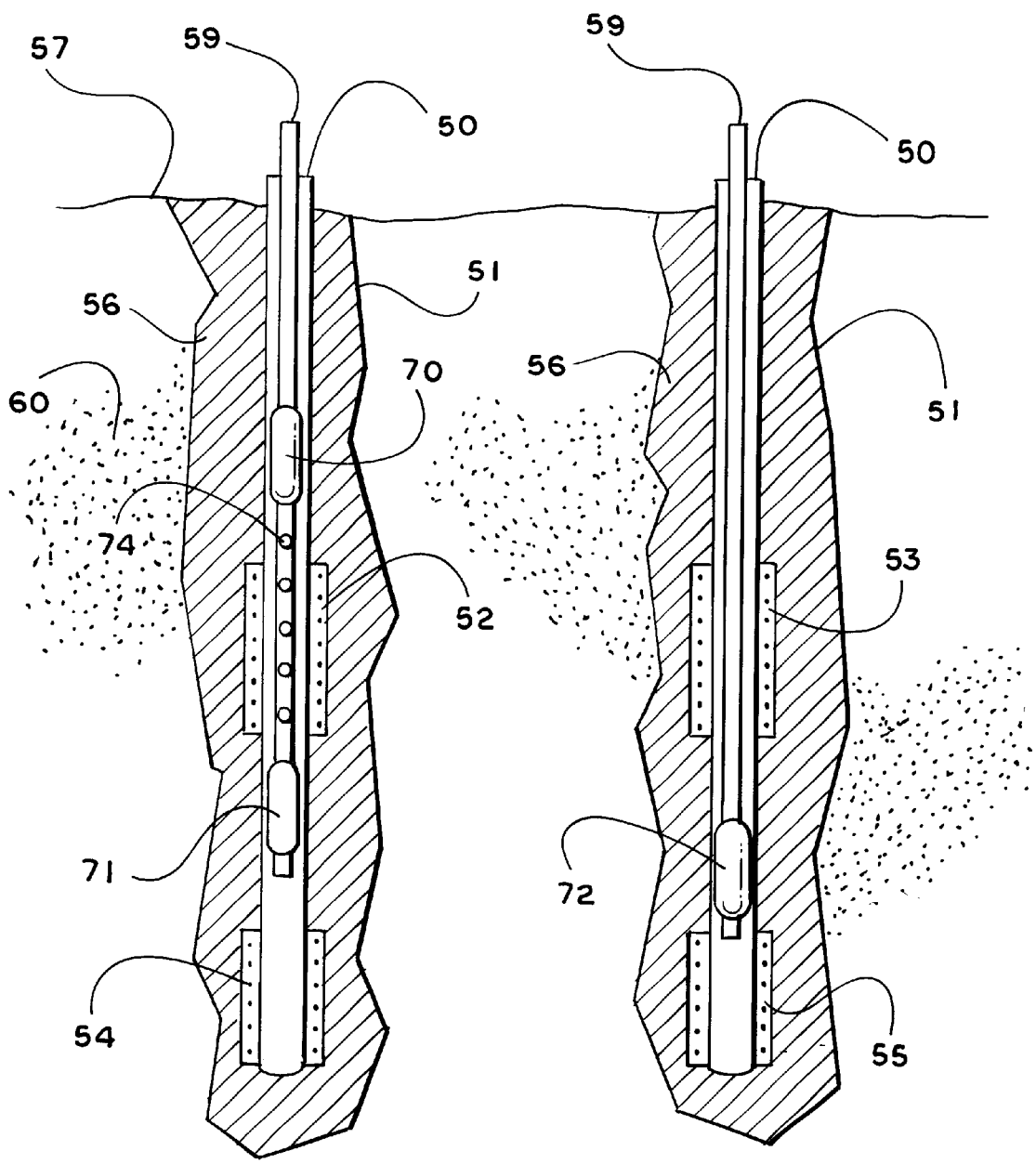

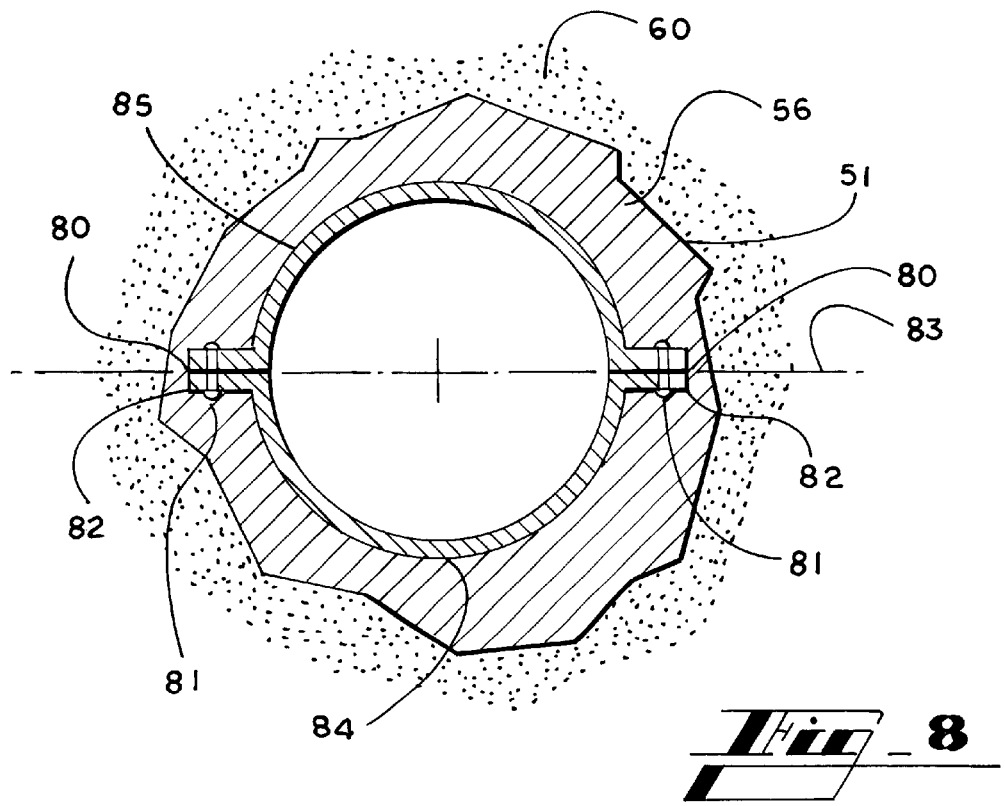
_Fig_8
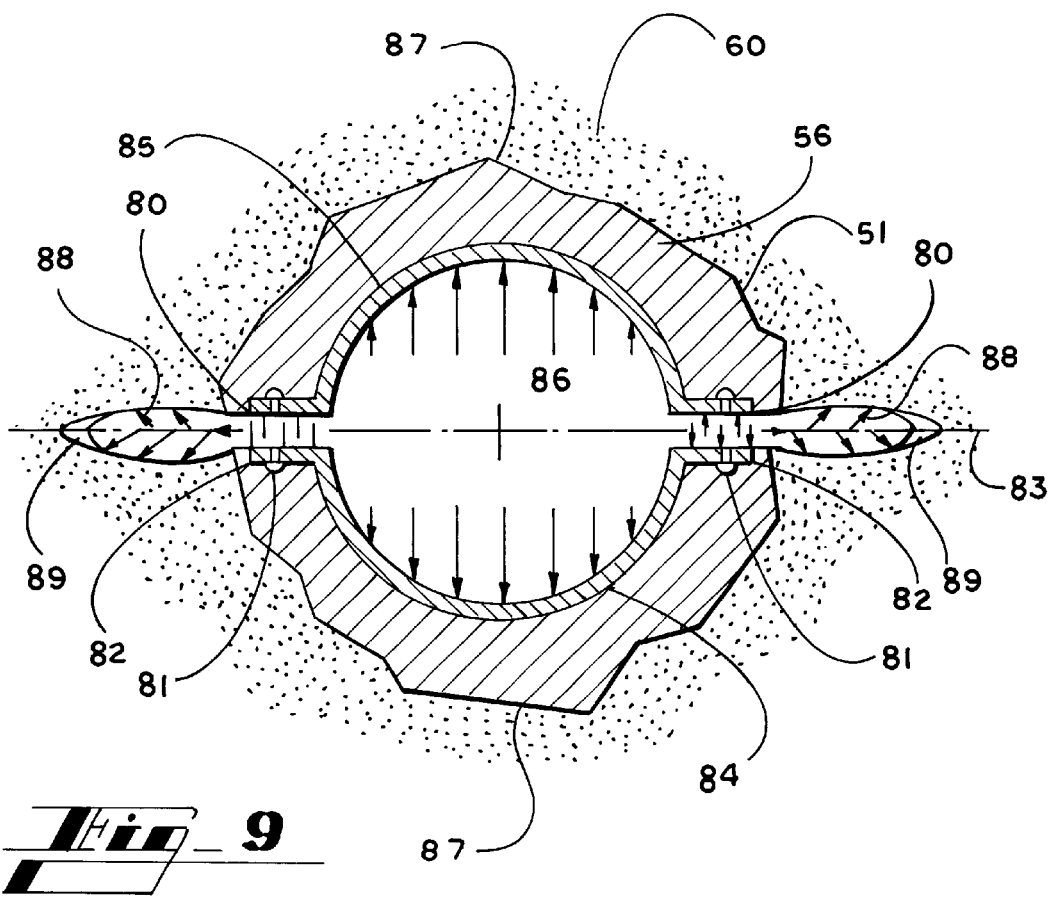
_Fig_9

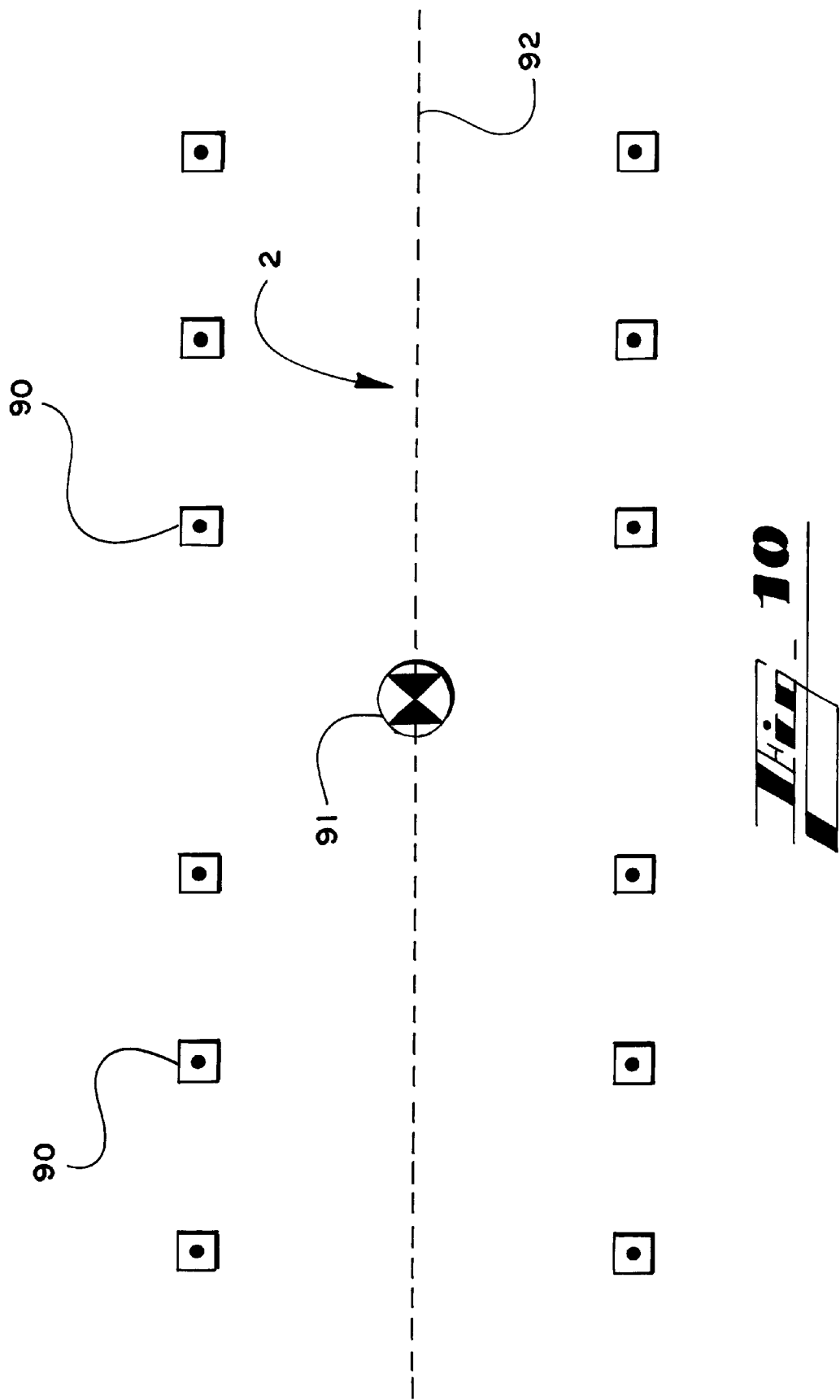

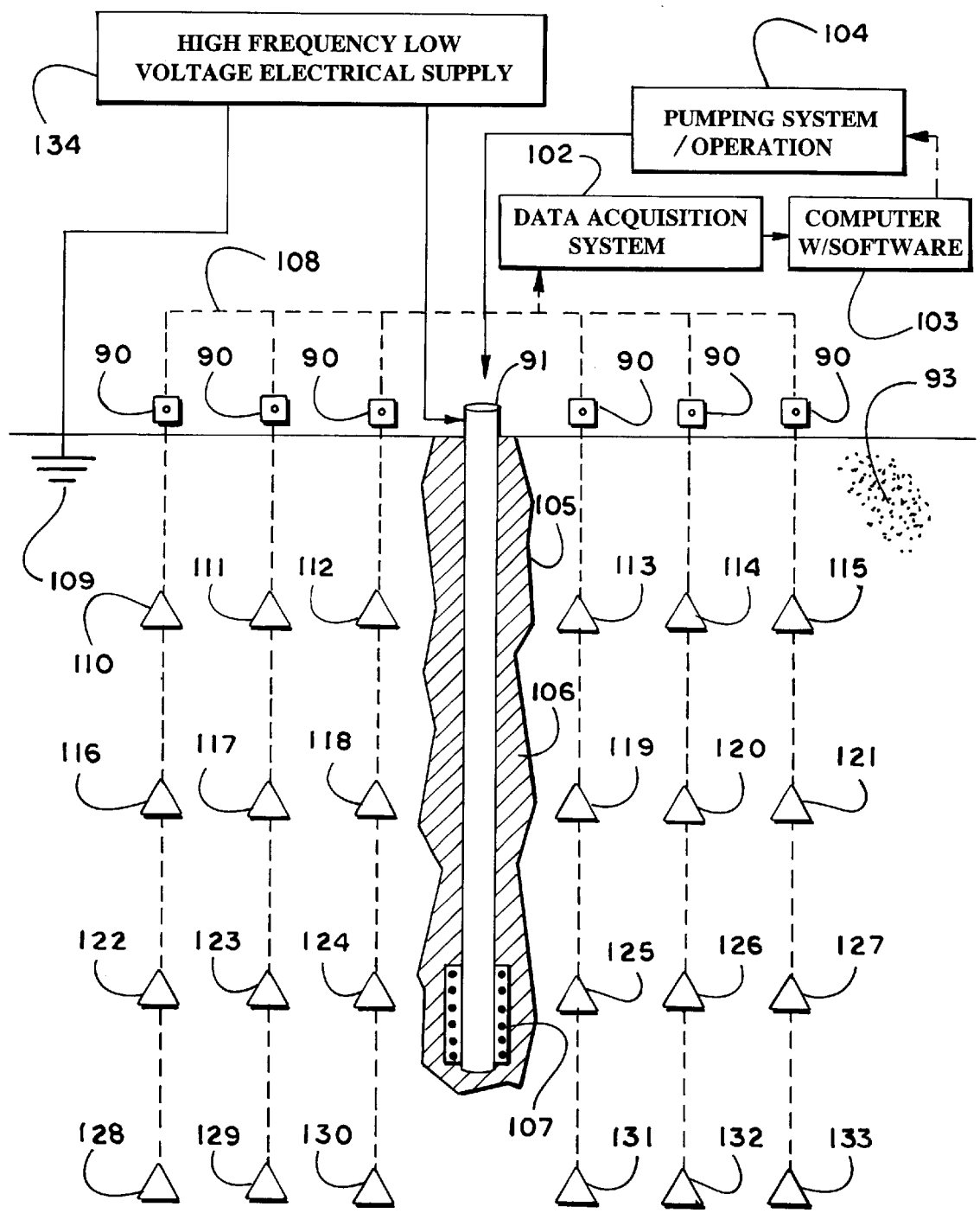
Fig_11

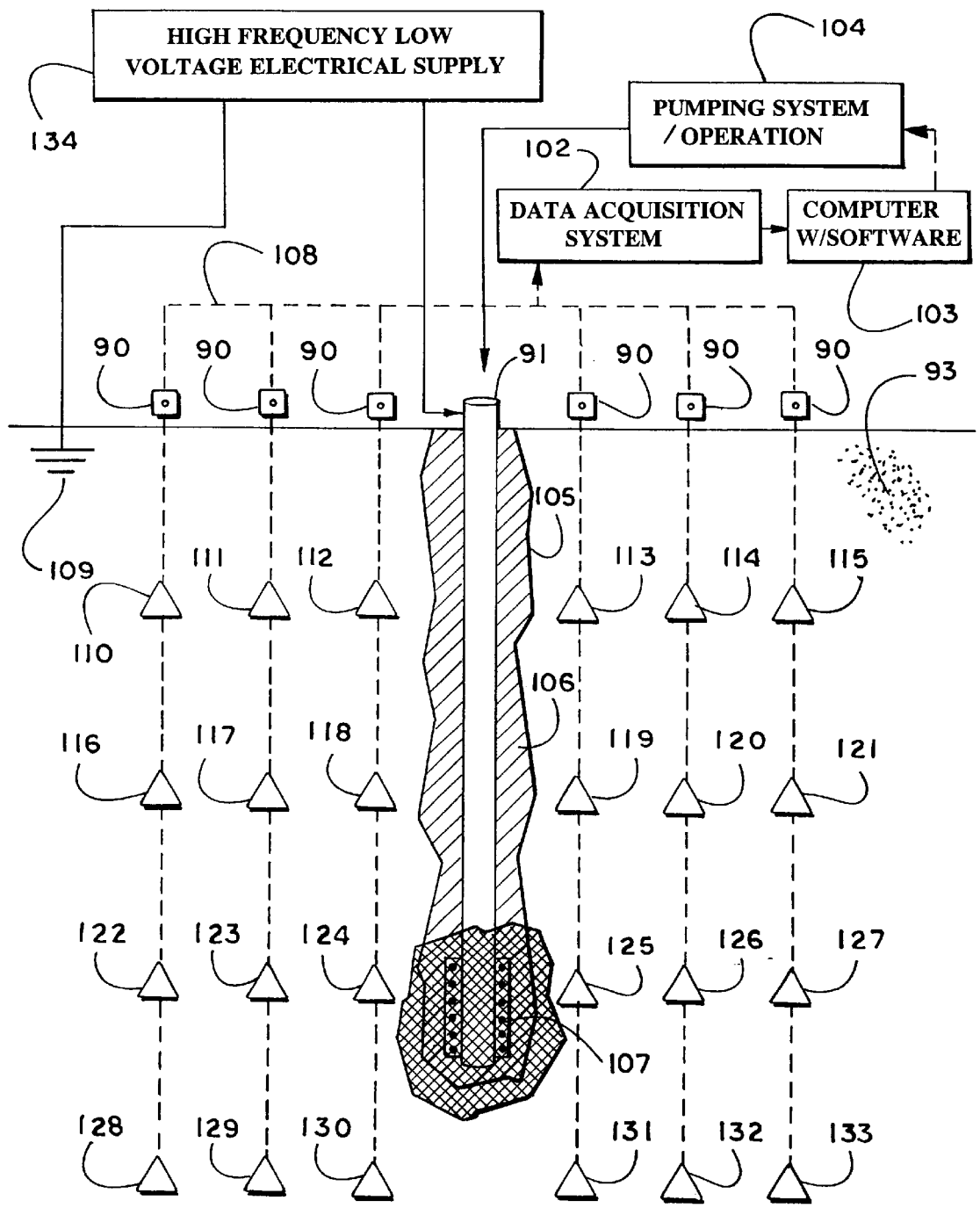
Fig_13

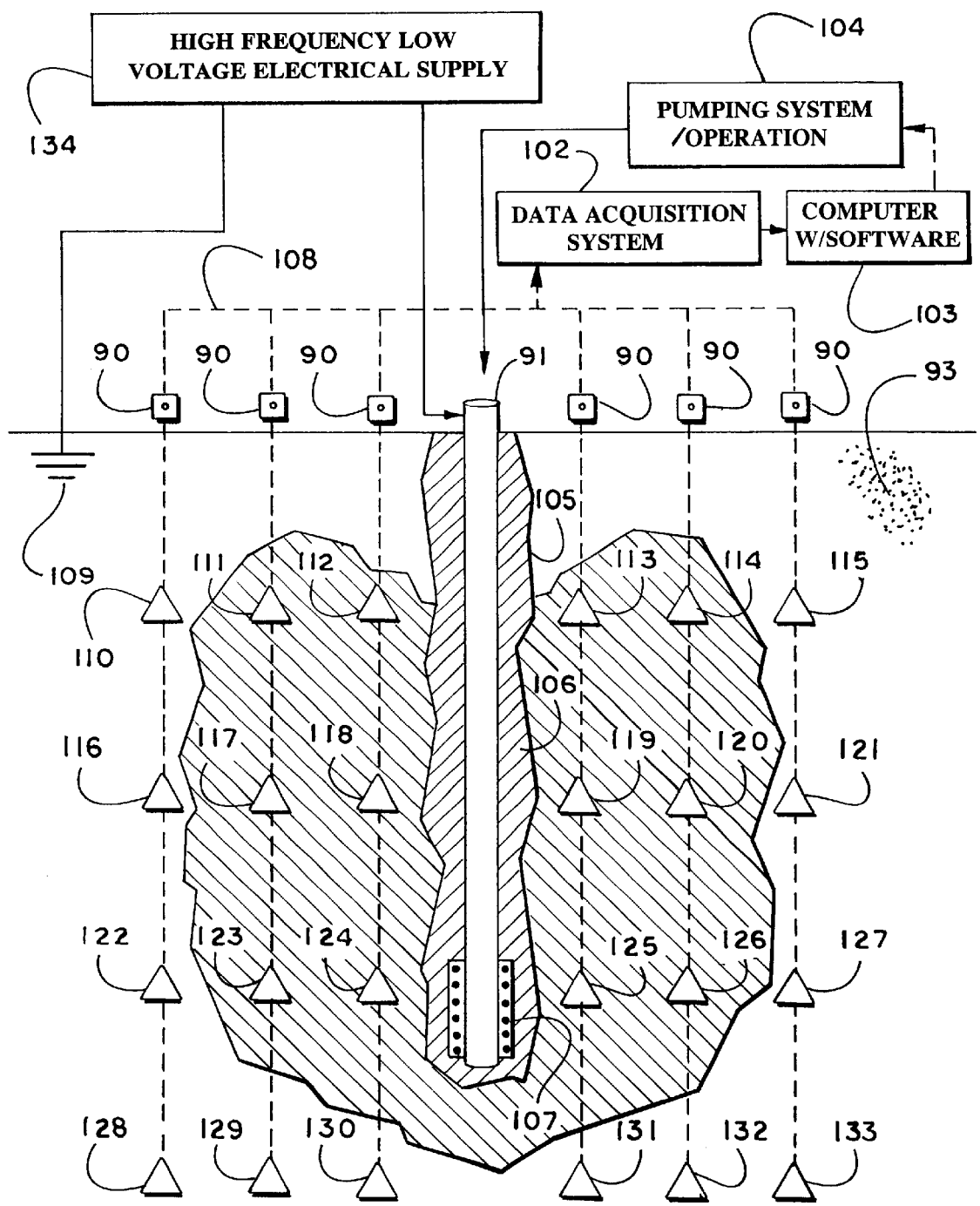
Fig_14

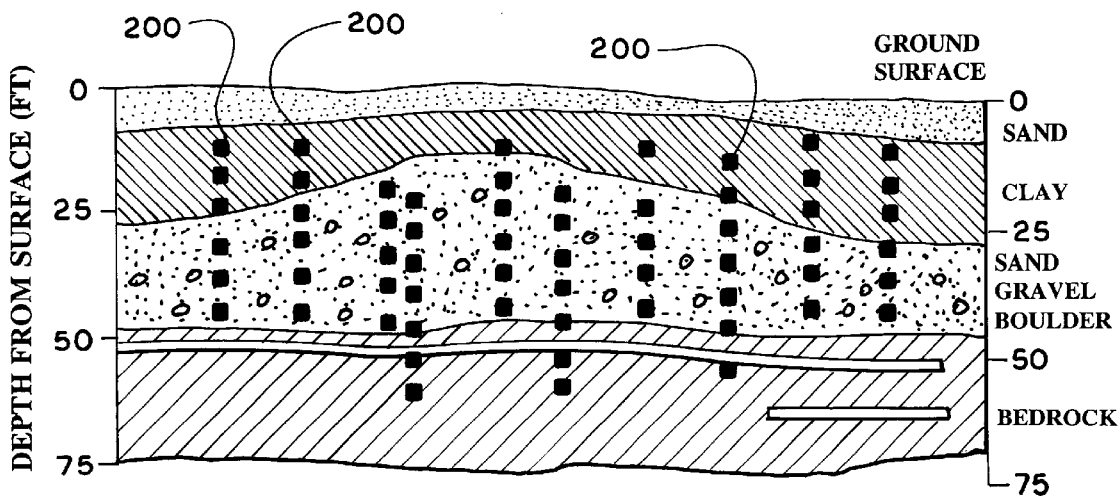
DOWN HOLE RESISTIVITY RECEIVERS
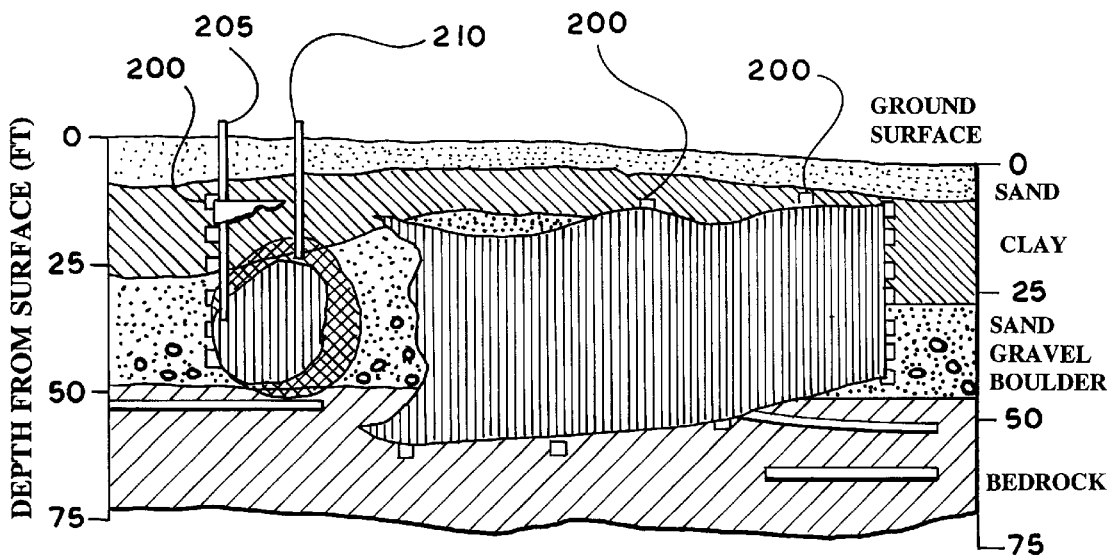
INDUCED VOLTAGES FROM PROPAGATING FRACTURE

AZIMUTH CONTROL OF HYDRAULIC VERTICAL FRACTURES IN UNCONSOLIDATED AND WEAKLY CEMENTED SOILS AND SEDIMENTS

CROSS-REFERENCE TO RELATED APPLICATIONS

This application claims priority benefits under 35 U.S.C. § 120 based on and is a continuation of U.S. patent application Ser. No. 09/193,784, filed Nov. 17, 1998, now U.S. Pat. No. 6,216,783, entitled "AZIMUTH CONTROL OF VERTICAL HYDRAULIC FRACTURES IN UNCONSOLIDATED AND WEAKLY CEMENTED SOILS AND SEDIMENTS." This parent application is entirely incorporated herein by reference.

TECHNICAL FIELD

The present invention generally relates to constructing subsurface structures by injecting a fracture fluid to fracture underground formations, and more particularly to a method and apparatus for creating a vertical fracture oriented at a predetermined azimuth in unconsolidated and weakly cemented soils and sediments resulting in subsurface containment walls and or treatment barriers.

BACKGROUND OF THE INVENTION

Subsurface structures are installed to perform various environmental, geotechnical, and petroleum recovery functions. In the case of environmental and geotechnical applications, containment walls and treatment barriers are typically installed to extend from the ground surface to a subsurface zone. In these applications, the containment walls may include flow containment walls which contain the flow of underground liquids, and treatment barriers which are permeable zones filled with reactive material. In many cases, the construction process must penetrate many feet below the ground surface before reaching a subsurface zone that requires a structure such as a containment wall or a treatment barrier. Examples of construction techniques performed in the prior art are sheet piling walls, slurry walls, braced excavations, and continuous trenches.

Current construction techniques required to install the above containment walls and treatment barriers share many common problems, such as the necessity to reroute underground utilities, potential structural damage to existing buildings and structures, potentially large staging areas for construction equipment, specialized and expensive equipment. In many cases, the removal and proper disposal of contaminated soils and liquids recovered from the excavation is required. Most of the above examples, for either economical or technical reasons, have a maximum wall or barrier depth that may not allow a project to be completed or even begun.

Turning now to the prior art, hydraulic fracturing of subsurface earth formations to stimulate production of hydrocarbon fluids from subterranean formations has been carried out in many parts of the world for over fifty years. The earth is hydraulically fractured either through perforations in a cased well bore or in an isolated section of an open bore hole. The horizontal and vertical orientation of the hydraulic fracture is controlled by the compressive stress regime in the earth and the fabric of the formation. It is well known in the art of rock mechanics that a fracture will occur in a plane perpendicular to the direction of the minimum stress, see U.S. Pat. No. 4,271,696 to Wood. At significant depth, one of the horizontal stresses is generally at a minimum, resulting in a vertical fracture formed by the hydraulic fracturing process. It is also well known in the art that the azimuth of the vertical fracture is controlled by the orientation of the minimum horizontal stress.

At shallow depths, the horizontal stresses could be less or greater than the vertical overburden stress. If the horizontal stresses are less than the vertical overburden stress, then vertical fractures will be produced; whereas if the horizontal stresses are greater than the vertical overburden stress, then a horizontal fracture will be formed by the hydraulic fracturing process.

Techniques to induce a preferred horizontal orientation of the fracture from a well bore are well known. These techniques include slotting, by either a gaseous or fluid jet under pressure, to form a horizontal notch in an open bore hole. Such techniques are commonly used in the petroleum and environmental industry. The slotting technique performs satisfactorily in producing a horizontal fracture, provided that the horizontal stresses are greater than the vertical overburden stress, or the earth formation has sufficient horizontal layering or fabric to ensure that the fracture continues propagating in the horizontal plane. Perforations in a horizontal plane to induce a horizontal fracture from a cased well bore have been disclosed, but such perforations do not preferentially induce horizontal fractures in formations of low horizontal stress. See U.S. Pat. No. 5,002,431 to Heymans.

Various means for creating vertical slots in a cased well bore have been disclosed. The prior art recognizes that a chain saw can be used for slotting the casing. See U.S. Pat. No. 1,789,993 to Switzer; U.S. Pat. No. 2,178,554 to Bowie, et al., U.S. Pat. No. 3,225,828 to Wisenbaker; and U.S. Pat. No. 4,119,151 to Smith. Installing pre-slotted or weakened casing has also been disclosed in the prior art as an alternative to perforating the casing. See U.S. Pat. No. 5,103,911 to Heijnen. These methods in the prior art were not concerned with the azimuth orientation of two opposing slots for the preferential initiating of a vertical hydraulic fracture at a predetermined azimuth orientation. It has been generally accepted in the art that the fracture azimuth orientation cannot be controlled by such means. These methods were an alternative to perforating the casing to achieve better connection between the well bore and the surrounding formation.

In the art of hydraulic fracturing subsurface earth formations from subterranean wells at depth, it is well known that the earth's compressive stresses at the region of fluid injection into the formation will typically result in the creation of a vertical two "winged" structure. This "winged" structure generally extends laterally from the well bore in opposite directions and in a plane generally normal to the minimum in situ horizontal compressive stress. This type of fracture is well known in the petroleum industry as that which occurs when a pressurized fracture fluid, usually a mixture of water and a gelling agent together with certain proppant material, is injected into the formation from a well bore which is either cased or uncased. Such fractures extend radially as well as vertically until the fracture encounters a zone or layer of earth material which is at a higher compressive stress or is significantly strong to inhibit further fracture propagation without increased injection pressure.

It is also well known in the prior art that the azimuth of the vertical hydraulic fracture is controlled by the stress regime with the azimuth of the vertical hydraulic fracture being perpendicular to the minimum horizontal stress direction. Attempts to initiate and propagate a vertical hydraulic fracture at a preferred azimuth orientation have not been successful, and it is widely believed that the azimuth of a vertical hydraulic fracture can only be varied by changes in the earth's stress regime. Such alteration of the earth's local stress regime has been observed in petroleum reservoirs subject to significant injection pressure and during the withdrawal of fluids resulting in local azimuth changes of vertical hydraulic fractures.

The determination of the hydraulic fracture geometry, such as its horizontal or vertical orientation, azimuth and length of the vertical fracture, and the extent and depth of a horizontal fracture, can be made from the measurement of earth tilts by conventional surface or bore hole mounted biaxial tiltmeters, see U.S. Pat. No. 4,271,696 to Wood. Highly sensitive electronic tiltmeters, capable of measuring tilts less than $10^{-7}$ radians, measure the earth's deformation due to the opening and propagation of a hydraulic fracture. From monitoring these tilts in real time along with the flow of injected fluid, the hydraulic fracture geometry can be determined. See U.S. Pat. Nos. 4,271,696 and 4,353,244 to Wood. Influence functions that relate the opening of a fracture to ground deformation can be utilized to calculate the fracture geometry. As suggested by U.S. Pat. No. 5,002,431 to Heymans, the fracture geometry can be determined and controlled from the measurement of tilts and real time computer control. Heymans does not detail how the fracture geometry may be determined, nor does Heymans disclose how the interaction of ground tilts from multiple fractures can be resolved to determine fracture geometry.

The method of determining the hydraulic fracture geometry, disclosed by U.S. Pat. No. 4,353,244 to Wood, has a number of deficiencies. If (a) the fracture is non-planar, (b) if the fracture is not of the full initiated height, or (c) if multiple fractures are initiated in close proximity of each other, then fracture geometry determination is not assured.

Accordingly, there is a need for a method and apparatus for controlling the azimuth orientation of a vertical hydraulic fracture in formations of unconsolidated or weakly cemented sediments and soils.

There is a further need for a method and apparatus for monitoring and calculating in real time the propagation of the azimuth of vertical hydraulic fractures.

And, there is a further need for a method and apparatus for the creation and control of coalesced, overlapping, and interconnecting fractures to form a treatment barrier or containment wall formed from a fracture fluid.

SUMMARY OF THE INVENTION

The present invention is a method and apparatus for dilating the earth by various means from a bore hole or driven lance to initiate and to control the azimuth orientation of a vertical hydraulic fracture in formations of unconsolidated or weakly cemented sediments. The fracture is initiated by means of preferentially dilating the earth orthogonal to the desired azimuth direction. This dilation of the earth can be generated by a variety of means: a driven spade to dilate the ground orthogonal to the required azimuth direction, packers that inflate and preferentially dilate the ground orthogonal to the required azimuth direction, pressurization of a pre-weakened casing with the weaknesses aligned in the required azimuth orientation, pressurization of a casing with opposing slots cut along the required azimuth direction, or pressurization of a two "winged" artificial vertical fracture generated by cutting or slotting the casing, grout, and/or formation at the required azimuth orientation.

In addition to initiation of vertical fractures at a predetermined azimuth, the present invention further provides a method and apparatus for monitoring and controlling the propagation of the fractures along the predetermined azimuth. The present invention relies upon the determination of influence functions that relate the earth's deformation to the opening of an elementary fracture.

Using generally accepted principles of elasticity theory, influence functions such as Green's functions can be applied to the problem. See "Hydrodynamics" by H. Lamb, $4^{th}$ edition, Cambridge (1916) and "Treatise on Mathematical Theories of Elasticity" by A. E. H. Love, $4^{th}$ edition, Dover Publications (1944). If a series of Green's functions can be solved relating incremental measurements of the earth's induced voltage or deformation with the geometry change in an initiated fracture, then a sequential incremental solution can be determined. With a series of sequential incremental solutions, an inverse model can be created for a particular type of soil and sediment formation or for a specific formation. The geometry of the fracture can then be calculated during the injection process by a series of sequential incremental solution calculations involving the inverse model. Utilizing either measured ground tilts or measured induced voltages from electrifying the fracturing fluid, the user monitors the injected flow of the injected fluid to determine and control the in situ geometry of the fracture during the injection process.

Thus, by relating measured incremental ground tilts or measured induced voltages to yield incremental change of the fracture geometry constrained by the incremental volume of injected fluid into each fracture, the incremental change in geometry of each fracture is found by minimizing the differences in the computed and measured incremental tilts or induced voltages. The essential difference between the present invention and the prior art is the utilization of a sequential incremental solution to determine incremental fracture geometry changes as the fracture is propagating. Such a method yields the fracture geometry at a particular time during the injection process. Without a sequential incremental solution method to determine the in situ fracture geometry, the system of equations is poorly defined, and a large range of differing geometry of fractures can fit or yield the same tilt field.

The present method and apparatus determine the fracture geometry by active resistivity after initiating a hydraulic fracture in moderate to highly resistive ground conditions. The fracture fluid is electrically conductive and is electrically energized by an alternating electrical source, typically a 100 Hz low voltage source. Real time instrumentation monitors resistivity receivers for surface and sub-surface induced voltages of the 100 Hz signal due to the energized fracture fluid in the propagating fracture. Surface and sub-surface induced voltages are recorded. By utilizing potential influence functions of the induced voltage in the earth due to an elementary electrified fracture, and from an incremental inverse model constrained by the incremental volume of injected fluid, the fracture geometry is determined in real time during the injection process.

The active resistivity method of monitoring fracture geometry requires that the fracture fluid be at least twenty times more conductive than the surrounding ground, to ensure a sharp signal and high contrast between the fracture and the surrounding medium. In this case, the energized fracture can be approximated as an electrified sheet, and potential influence functions of the earth's induced voltages from an elementary electrified fracture can be formulated. The fracture fluid can be made conductive by the addition of soluble salts or by the selection of a suitable fracture fluid that has a high conductivity. Fracture fluids suitable for this method and apparatus can comprise, but are not limited to, a water based guar gum gel for a permeable treatment barrier and a bentonite cement slurry for an impermeable containment barrier.

From real time monitoring of the earth's induced voltages due to the propagating electrified fracture and from the flow of injected fluid into the fracture, the geometry of the fracture can be determined. Influence functions relate the earth's induced voltage to the propagation of an elementary electrified fracture. By solving the inverse problem of measured incremental induced voltages to yield fracture incremental geometry change constrained by the incremental volume of injected fluid into each fracture, the incremental change in geometry of each fracture can be found by minimizing the differences in the computed and measured incremental induced voltages.

If the initiated hydraulic fracture is relatively deep, down hole resistivity receivers are used to obtain a high precision image of the energized fracture. Active resistivity monitoring has the added benefit of determining when individual fractures coalesce and thus become electrically connected. That is, by energizing the fracture fluid in each injected well bore individually and in unison, the electrical coalescence of multiple fractures from different well bores can be clearly recorded and observed. The imaging and observation of the down hole resistivity data focuses on quantifying the continuity of the fractures and assessing the fracture continuity to determine if any holes or gaps are present. Such monitoring allows construction procedures to be modified to ensure the hydraulic fractures are installed as planned and allows contingency measures to be implemented immediately, e.g. an additional fracture to patch any hole or additional injection volumes to ensure coalescence or sufficient overlap.

The present invention also pertains to a method for constructing subsurface structures including containment walls or treatment barriers by injecting a liquid slurry into an azimuth controlled hydraulic fracture or fractures to form either a continuous or overlapping system of fractures. By initiating and propagating azimuth orientated vertical hydraulic fractures from a series of bore holes aligned in the required azimuth direction, coalesced and overlapping fractures are created to form a containment wall or treatment barrier composed of the fracture fluid. The process of monitoring and calculating the fracture in situ geometry during the injection process, enables determination of when to cease injection or whether to continue injection to achieve the required shape, extent, coalescence, or degree of overlap of the azimuth orientated vertical hydraulic fractures.

The fracture fluid used to form the containment walls and treatment barriers in the vertical fractures has two purposes. First the fracture fluid must be formulated in order to initiate and propagate the fracture within the underground formation. In that regard the fracture fluid has certain attributes. The fracture fluid fracture fluid should not leak off into the formation, the fracture fluid should be clean breaking with minimal residue, and the fracture fluid should have a low friction coefficient.

Second, once injected into the fracture, the fracture fluid forms the containment wall or the treatment barrier. In that regard, the fracture fluid comprises a proppant which produces the integrity for a containment wall or the active component for a treatment barrier. Such proppants for containment walls may include, for example, perlite in a bentonite cement slurry. Such proppants for treatment barriers may include, for example, iron filings. The proppants are selected and formulated to accomplish the purpose intended for the containment wall or the treatment barrier.

The present invention is applicable only to formations of unconsolidated or weakly cemented sediments and soils with low cohesive strength compared to the vertical overburden stress prevailing at the depth of the hydraulic fracture. Low cohesive strength is defined herein as the greater of 200 pounds per square inch (psi) or 25% of the total vertical overburden stress. The method is not applicable to consolidated rock formations, in which the fracture azimuth is controlled by the rock formation stress regime.

Although the present invention contemplates the formation of fractures which generally extend laterally away from a vertical or near vertical well penetrating an earth formation and in a generally vertical plane in opposite directions from the well, i.e. a vertical two winged fracture, those skilled in the art will recognize that the invention may be carried out in earth formations wherein the fractures and the well bores can extend in directions other than vertical.

Therefore, the present invention provides a method and apparatus for controlling the azimuth of a vertical hydraulic fracture in formations of unconsolidated or weakly cemented sediments and soils.

The present invention also provides a method and apparatus for the creation and control of coalesced, overlapping, and interconnecting fractures to form a containment barrier or treatment wall.

Further, the present invention provides a method and apparatus for monitoring and calculating in real time the propagation of a vertical hydraulic fracture.

Other objects, features and advantages of the present invention will become apparent upon reviewing the following description of the preferred embodiments of the invention, when taken in conjunction with the drawings and the claims.

BRIEF DESCRIPTION OF THE DRAWINGS

FIG. 1 is a plan view of two injection well casings depicting the design centerline of the fracture wall before the azimuth controlled vertical hydraulic fractures are initiated.

FIG. 2 is a cross-sectional side view of the installed injection well casings as shown in FIG. 1.

FIG. 3 is an enlarged plan view of an individual pre-fracture injection well casing as shown in FIGS. 1 and 2.

FIG. 4 is an enlarged plan view of an individual pre-fracture injection well casing with a slot cut through the injection casing wall and grout, where the slot is aligned with the design centerline of the fracture wall.

FIG. 5 is a cross-sectional side view of an individual pre-fracture injection well casing with the length of a vertical slot shown.

FIG. 7 is a cross-sectional side view of two injection casings with winged initiation sections of the injection casing construction for azimuth controlled vertical fracture initiation.

FIG. 8 is a plan view detail of the fabrication and installation of the winged initiation sections of the injection casing construction prior to initiation of the azimuth controlled vertical fracture.

FIG. 9 is a plan view detail of the initiation of an azimuth controlled vertical fracture from a winged initiation section of the injection casing construction.

FIG. 10 is a plan view of an individual injection well casing with locations of the vertical installed resistivity arrays, parallel and offset to the design centerline of the azimuth controlled vertical fracture that has not yet been initiated.

FIG. 11 is a cross-sectional side view showing the construction detail and arrangement of a resistivity sensor array.

FIG. 13 is cross-sectional side view of the initial start of an azimuth controlled vertical fracture superimposed on FIG. 11.

FIG. 14 is a cross-sectional side view of the final design geometry of an azimuth controlled vertical fracture superimposed on FIG. 11.

FIG. 15 is the visual display of an arrangement of individual resistivity receivers in a ground formation prior to initiation of an azimuth controlled vertical fracture in the subsurface.

FIG. 16 is the visual display showing the measured voltages of the individual resistivity receivers against background reference voltages illustrating a propagating azimuth controlled vertical fracture in the subsurface.

DETAILED DESCRIPTION OF THE DISCLOSED EMBODIMENT

Figure 6:
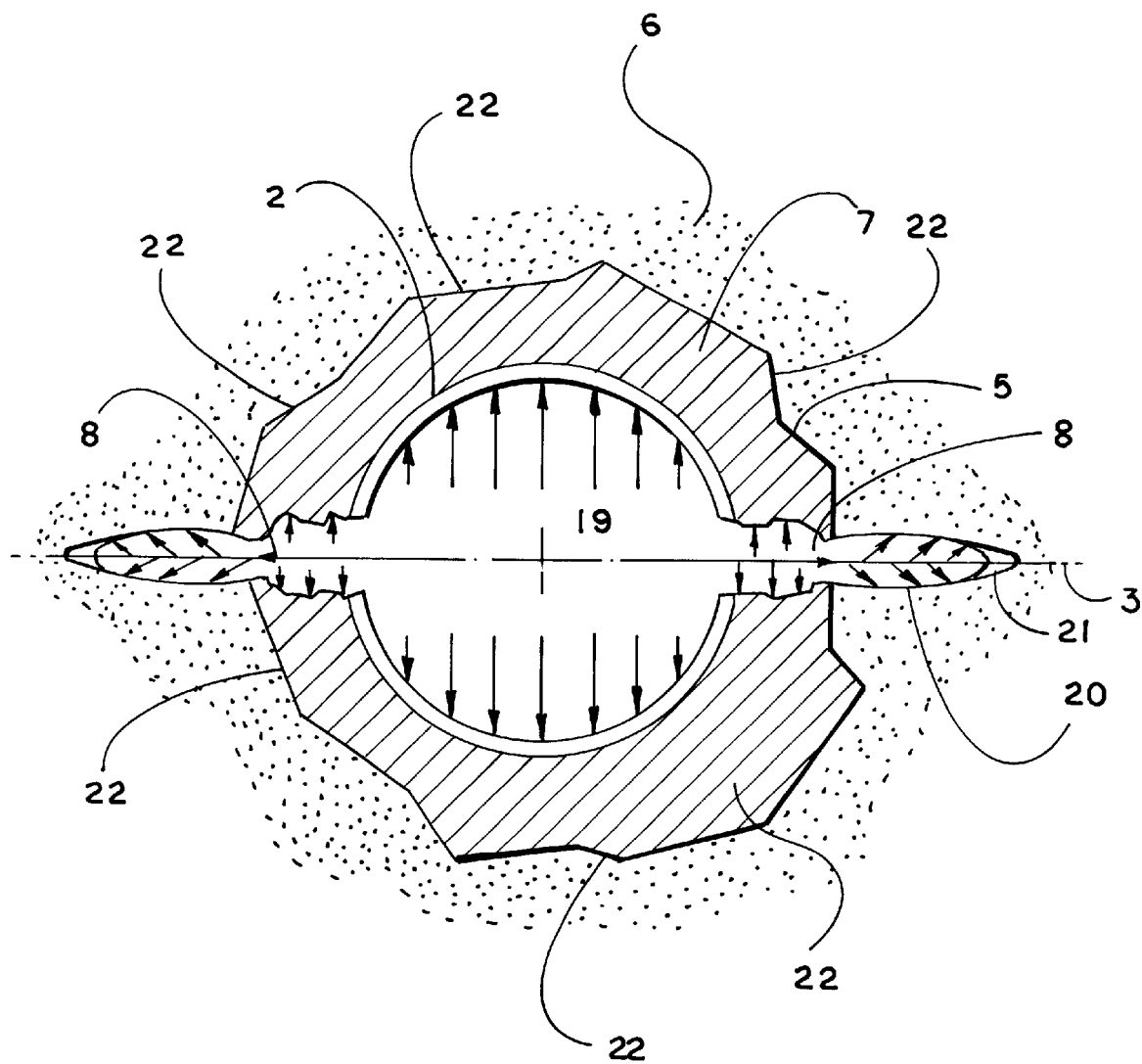
FIG. 6 is an enlarged plan view of an individual injection well casing during initial propagation of the azimuth controlled vertical fracture.

Several embodiments of the present invention are described below and illustrated in the accompanying drawings. The present invention involves a method and apparatus for initiating and propagating an azimuth controlled vertical fracture in subsurface formations of unconsolidated and weakly cemented soils and sediments. In addition, the present invention involves a method and apparatus for controlling and monitoring the fracture initiation, propagation, and geometry of a vertical fracture.

Referring to the drawings, in which like numerals indicate like elements, FIGS. 1, 2, and 3 illustrate the initial setup of the method and apparatus. Conventional bore holes 5 and 5' with axes 12 and 12' are completed by an auger, wash rotary, or cable tool methods into the formation 6 of unconsolidated or weakly cemented soils and sediments to a predetermined depth 9 below the ground surface 4 on the predetermined fracture line or plane 3 of the planned azimuth controlled vertical fracture. The fracture plane 3 extends radially from axis 12 to axis 12'. Injection casings 1 and 2 are installed to the predetermined to depth 9 and completed by placement of a grout 7 which completely fills the annular space between the outside the injection casings 1 and 2 and the bore holes 5 and 5'. Injection casings 1 and 2 must be constructed from a material that can withstand the pressures that the fracture fluid exerts upon the interior of the injection casings 1 and 2 during the pressurization of the fracture fluid. The grout 7 can be any conventional material that preserves the spacing between the exterior of the injection casings 1 and 2 and the bore holes 5 and 5' throughout the fracturing procedure, preferably a non-shrink or low shrink cement based grout.

The outer surface of the injection casings 1 and 2 should be roughened or manufactured such that the grout 7 bonds to the injection casings 1 and 2 with a minimum strength equal to the down hole pressure required to initiate an azimuth controlled vertical fracture. The bond strength of the grout 7 to the outside surface of the casings 1 and 2 prevents the pressurized fracture fluid from short circuiting along the casing-to-grout interface up is to the ground surface 4.

Referring to FIGS. 4 and 5, a casing cutter can be lowered into the injection casing 2 to a predetermined depth 11, and the injection casing 2 is cut vertically and parallel to the fracture plane 3 of the planned azimuth controlled vertical fracture. The lateral depth of cut shown in FIG. 4 is completely through the wall of injection casing 2 and through the majority of the grout 7. The length 10 of the vertical cut 8 into the injection casing 2 and the grout 7 is dependent upon the required size of the planned azimuth controlled vertical fracture, the site specific soil 6 type, and the in situ stress conditions within the soil 6. The lateral depth of the vertical cut 8 to control the azimuth of the vertical fracture may require laterally extending the vertical cut 8 into the surrounding soil 6. When this additional depth of vertical cut 8 is necessary, the resulting notch into the soil 6 is kept open prior to initiation of the vertical fracture.

Referring to FIG. 6, once the fracture is initiated, injection of a fracture fluid 20 through the injection casing 2, vertical cut 8, grout 7, and into the initiated fracture 21 can be made by any conventional means to pressurize the fracture fluid 20. The conventional means can include any pumping arrangement to place the fracture fluid 20 under the pressure necessary to transport the fracture fluid 20 into the initiated fracture 21 to assist in fracture propagation and to create a subsurface containment wall or treatment barrier. For successful fracture initiation and propagation to the desired size with maximum spacing of the injection casings 2, the preferred embodiment of the fracture fluid 20 should have the following characteristics.

The fracture fluid 20 should not excessively leak off or lose its liquid fraction into the adjacent unconsolidated soils and sediments. The fracture fluid 20 should be able to carry the solids fraction (the proppant) of the fracture fluid 20 at low flow velocities that are encountered at the edges of a maturing azimuth controlled vertical fracture. The fracture fluid 20 should have the functional properties for its end use such as longevity, strength, reactivity, permeability, etc. The fracture fluid 20 should be at least twenty times more conductive than the unconsolidated or weakly cemented soils and sediments in order to obtain sufficient electrical contrast for active resistivity methods for tracking the in situ geometry of the propagating azimuth controlled vertical fracture.

Permeable groundwater treatment barriers can be constructed by orientated vertical hydraulic fractures filled with a fracture fluid 20 having a treatment proppant. Treatment proppants can be reactive, absorbent or adsorbent, precipitates or biodegradable, depending upon the groundwater contaminants of concern. Reactive proppants can comprise, without limitation, the following: iron filings for the dechlorination of chlorinated solvents, such as organic contaminants: trichloroethane (TCE), cis 1,2-dichloroethane (cDCE), tetrachloroethene (PCE), 1,1-dichloroethene (11DCE), 1,1,1 Trichloroethane (111TCA), chloroform (TCM), carbon tetrachloride (CT) and vinyl chloride (VC). Absorbent or adsorbent proppants can comprise, without limitation, the following: activated alumina, activated carbon and resins for the absorption of metals, phosphate, nitrate, hydrocarbons, etc. Precipitation proppants comprise, without limitation, the following: iron filings for metal precipitation, and lime and slag for phosphate removal. Biodegradation proppants can comprise, without limitation, the following: enzyme, microbes, nutrients, growth substrates, etc. to achieve in situ biodegradation of the particular contaminant.

The fracture fluid 20 should be compatible with the proppant, the subsurface formation, and the formation fluids. Further, the fracture fluid 20 should be capable of controlling the viscosity of the proppant, and for carrying the proppant through the formation fracture. The fracture fluid 20 should be an efficient fluid, i.e. low leak off from the fracture into the formation, to be clean breaking with minimal residue, and to have a low friction coefficient. The fracture fluid 20 should not excessively leak off or lose its liquid fraction into the adjacent unconsolidated formation. For a permeable treatment barrier, the gel composed of starch should be capable of being degraded leaving minimal residue and not impart the properties of the fracture proppant. A low friction coefficient fluid is required to reduce pumping head losses in piping and down the well bore. When a hydraulic fracture permeable treatment barrier is desired, typically a gel is used with the proppant and the fracture fluid. Preferable gels can comprise, without limitation of the following: a water-based guar gum gel, hydroxypropylguar (HPG), a natural polymer or a cellulose-based gel, such as carboxymethylhydroxyethylcellulose (CMHEC). The gel is chosen for its minimal impact on the proppant material properties, such as reactivity, absorption, etc., and the extremely low gel residue in the treatment barrier once the enzyme has been degraded.

The gel is generally cross-linked to achieve a sufficiently high viscosity to transport the proppant to the extremes of the fracture. Cross-linkers are typically metallic ions, such as borate, antimony, zirconium, etc., disbursed between the polymers and produce a strong attraction between the metallic ion and the hydroxyl or carboxy groups. The gel is water soluble in the uncrossed-linked state and water insoluble in the cross-linked state. While cross-linked, the gel can be extremely viscous thereby ensuring that the proppant remains suspended at all times. An enzyme breaker can be added to controllably degrade the viscous cross-linked gel into water and sugars. The enzyme typically takes a number of days to biodegrade the gel, and upon breaking the cross-link and degradation of the gel, a permeable treatment wall of the proppant remains in the ground with minimal gel residue. For certain proppants, pH buffers can be added to the gel to ensure the gel's in situ pH is within a suitable range for enzyme activity. Salts comprising, but not limited to, sodium chloride, potassium chloride, and potassium bromide are added to the gel to achieve a sufficiently high gel electrical conductivity for mapping of the fracture geometry by the active resistivity method.

The fracture fluid-gel-proppant mixture is injected into the formation and carries the proppant to the extremes of the fracture. Upon propagation of the fracture to the required lateral and vertical extent, the predetermined fracture thickness may need to be increased by utilizing the process of tip screen out. This process involves modifying the proppant loading and/or fracture fluid 20 properties to achieve a proppant bridge at the fracture tip. The fracture fluid 20 is further injected after tip screen out, but rather then extending the fracture laterally or vertically, the injected fluid widens the fracture.

Impermeable flow containment walls constructed by oriented vertical hydraulic fracturing are typically composed of, without limitation, bentonite cement slurries with or without special additives for improving leak off performance, delaying setting time, and reducing water-to-cement ratios. The bentonite acts as the prime filter cake building material in the fracture fluid 20, but can be replaced by alternative materials, without limitation, such as silica flour and perlite. Generally, bentonite cement slurry has a sufficiently high electrical conductivity for the active resistivity mapping technique.

The density of the fracture fluid 20 can be altered by increasing or decreasing the proppant loading or modifying the density of the proppant material. In many cases, the fracture fluid 20 density will be controlled to ensure the fracture propagates downwards initially and achieves the required height of the planned structure. Such downward fracture propagation requires the gel density to be typically greater than 1.25 gm/cc.

The viscosity of the fracture fluid 20 should be sufficiently high to ensure the proppant remains suspended during injection into the subsurface, otherwise dense proppant materials will sink or settle out and light proppant materials will flow or rise in the fracture fluid 20. The required viscosity of the fracture fluid 20 depends on the density contrast of the proppant and the gel and the proppant's maximum particulate diameter. For medium grain-size iron filings, that is of grain size similar to a medium sand, a fracture fluid 20 viscosity needs to be typically greater than 100 centipoise at a shear rate of 1/sec.

Referring to FIGS. 4, 5, and 14, the fracture is initiated by pumping the fracture fluid 20 with a pumping system 104 through the injection casing 2, 91 to the previously slotted injection casing 2, 91 and grout 7, 106. As best shown in FIG. 4, when the pressure of the fracture fluid 20 increases, the fracture fluid 20 will exert lateral forces 19 on the interior of the injection casing 2 and the interior of the vertical cut 8. The lateral forces 19 will be perpendicular to the fracture plane 3 of the planned azimuth controlled vertical fracture. The injection casing 2 and grout 7 are shown to be separating in the direction perpendicular to the fracture plane 3 of the planned azimuth controlled vertical fracture.

As best shown in FIG. 6, when the pressure of the fracture fluid 20 is increased to a level which exceeds the lateral earth pressures, the grout 7 which is bonded to the injection casing 2 will begin to dilate the adjacent soil 6 forming a parting 21 of the soil 6 along the fracture plane 3 of the planned azimuth controlled vertical fracture. The fracture fluid 20 rapidly fills the parting 21 of the soil 6 in the vertical cut 8. Within the injection casing 2, the fracture fluid 20 exerts normal forces on the soil 6 perpendicular to the fracture plane 3 which progressively extends the parting 21 and continues to maintain the required azimuth of the initiated fracture. The azimuth controlled vertical fracture will be expanded by continuous pumping of the fracture fluid 20 until the desired geometry is achieved.

In another embodiment for azimuth controlled vertical fracture initiation refer to FIGS. 7, 8, and 9. As best shown in FIG. 7, conventional bore holes 51 can be completed by an auger, wash rotary, or cable tool methods below the ground surface 57 to the required depth. Injection casings 50 along with wing initiation sections 52, 53, 54, 55 are installed at predetermined depths within the bore holes 51. The wing initiation sections 52, 53, 54, 55 can be constructed from the same material as the injection casings 50. The wing initiation sections 52, 53, 54, 55 are aligned parallel and through the fracture plane 83 of the pre-constructed azimuth controlled vertical fracture. The alignment of the wing initiation sections 52, 53, 54, 55 to the fracture plane 83 can be performed by a conventional down hole camera with an attached magnetic compass or by a down hole gyroscopic instrument before the grout 56 is placed in the annular space between the bore hole 51 and the injection casings 50 and the wing initiation sections 52, 53, 54, 55. The outer surface of the injection casings 51 and of the wing initiation sections 52, 53, 54, 55 should be a roughened or manufactured surface such that the bond of the grout 56 is greater than the fracture initiation pressure. The position below ground surface of the winged initiation sections 52, 53, 54, 55 will depend on the required in situ geometry site specific soil properties and the in situ soil stresses.

The winged initiation sections 52, 53, 54, 55 are preferably constructed from two symmetrical halves 84, 85 as shown in FIGS. 8 and 9. The configuration of the winged initiation sections 52, 53, 54, 55 is not limited to the shape shown, but the chosen configuration must permit the initiating fracture to propagate laterally in at least two opposing directions away from the fracture plane 83 of the winged initiation sections 52, 53, 54, 55. In FIG. 8, prior to initiating the fracture, the two symmetrical halves 84, 85 of the winged initiation sections 52, 53, 54, 55 are connected together by shear fasteners 81 and the two symmetrical halves 84, 85 are sealed by gasket 80. The gaskets 80 and the shear fasteners 81 are designed to keep the grout 56 from leaking into the interior of the winged initiation sections 52, 53, 54, 55 during the grout 56 placement. Furthermore, the gaskets 80 and shear fasteners 81 are designed to separate along the fracture plane 83 of the winged initiation sections 52, 53, 54, 55 during fracture initiation, as shown in FIG. 9, without physical damage to the two symmetrical halves 84, 85 of the winged initiation sections 52, 53, 54, 55. Any means of connecting the two symmetrical halves 84, 85 of the winged initiation sections 52, 53, 54, 55 can be made, including but not limited to clips, glue, or weakened fasteners, as long as the pressure keeping the two symmetrical halves 84, 85 together is greater than the pressure of the grout 56 on the exterior of the winged initiation sections 52, 53, 54, 55, i.e. the grout 56 is prevented from leaking into the interior of the winged initiation sections 52, 53, 54, 55. When the wall and or barrier geometry requires that the fractures be initiated and propagated from discrete soil zones 60 in the same injection casing 50, individual winged initiation sections 52, 53, 54, 55 or vertical cuts 8 in the injection casing 50 can be isolated with mechanical or inflatable packers 70, 71 prior to fracture initiation.

Referring to FIG. 7, two embodiments of the method are shown. In the first embodiment on the right, when the soil zone 60 surrounding the lower winged initiation section 55 requires that fracture initiation and propagation begin below upper winged initiation section 53, a single isolation packer 72 is set in injection casing 50 just above the winged initiation section 55. The fracture fluid 20 is pumped from the pumping/system operation 104, see FIG. 14, into the pressure pipe 59 and through the single isolation packer 72. As the fracture fluid 20 pressure increases below the single isolation packer 72, the azimuth controlled vertical fracture is initiated and propagated as previously described. To initiate an azimuth controlled vertical fracture in the soil zone 60 around winged initiation section 52, upper and lower isolation packers 70, 71 are positioned in the injection casing 50 and set above and below the winged initiation section 52, as shown by the embodiment on the left. The upper isolation packer 70 is connected to lower isolation packer 71 by a perforated pipe 74. The bottom of the lower isolation packer 71 is plugged to prevent fracture fluid 20 from flowing through the lower isolation packer 71. With both isolation packers 70, 71 set, the fracture fluid 20 is pumped from the pumping/system operation 104, see FIG. 14, into a pressure pipe 59 through the upper isolation packer 70, and exits into the upper winged initiation section 52 from the perforations in the perforated pipe 74. As the pressure of the fracture fluid 20 increases between the set upper and lower isolation packers 70, 71, the azimuth controlled vertical fracture is initiated and propagated as previously described.

Referring to FIG. 9, as the pressure of the fracture fluid 20 is increased to a level which exceeds the lateral earth pressures, the two symmetrical halves 84, 85 of the winged initiation sections 84, 85 will begin to separate along the fracture plane 83 of the winged initiation sections 84, 85 during fracture initiation without physical damage to the two symmetrical halves 84, 85 of the winged initiation sections 84, 85. The gaskets 80 and shear fasteners 81 fracture along the fracture plane 83 of the winged initiation sections 84, 85 during fracture initiation, as shown in FIG. 9, without physical damage to the two symmetrical halves 84, 85 of the winged initiation sections 84, 85. During separation of the two symmetrical halves 84, 85 of the winged initiation sections 84, 85, the grout 56, which is bonded to the injection casing 50, see FIG. 7, and the two symmetrical halves 84, 85 of the winged initiation sections 84, 85 will begin to dilate the adjacent soil 60 forming a parting 89 of the soil 60 along the fracture plane 83 of the planned azimuth controlled vertical fracture. The fracture fluid 20 rapidly fills the parting 89 of the soil 60 by the initiated fracture. Within the two symmetrical halves 84, 85 of the winged initiation sections 84, 85, the fracture fluid 20 exerts normal forces 86 on the soil 60 perpendicular to the fracture plane 83 and opposite to the soil 60 horizontal stresses 87. Thus, the fracture fluid 20 progressively extends the parting 89 and continues to maintain the required azimuth of the initiated fracture. The azimuth controlled vertical fracture will be expanded by continuous pumping of the fracture fluid 20 until the desired geometry is achieved.

Figure 12:
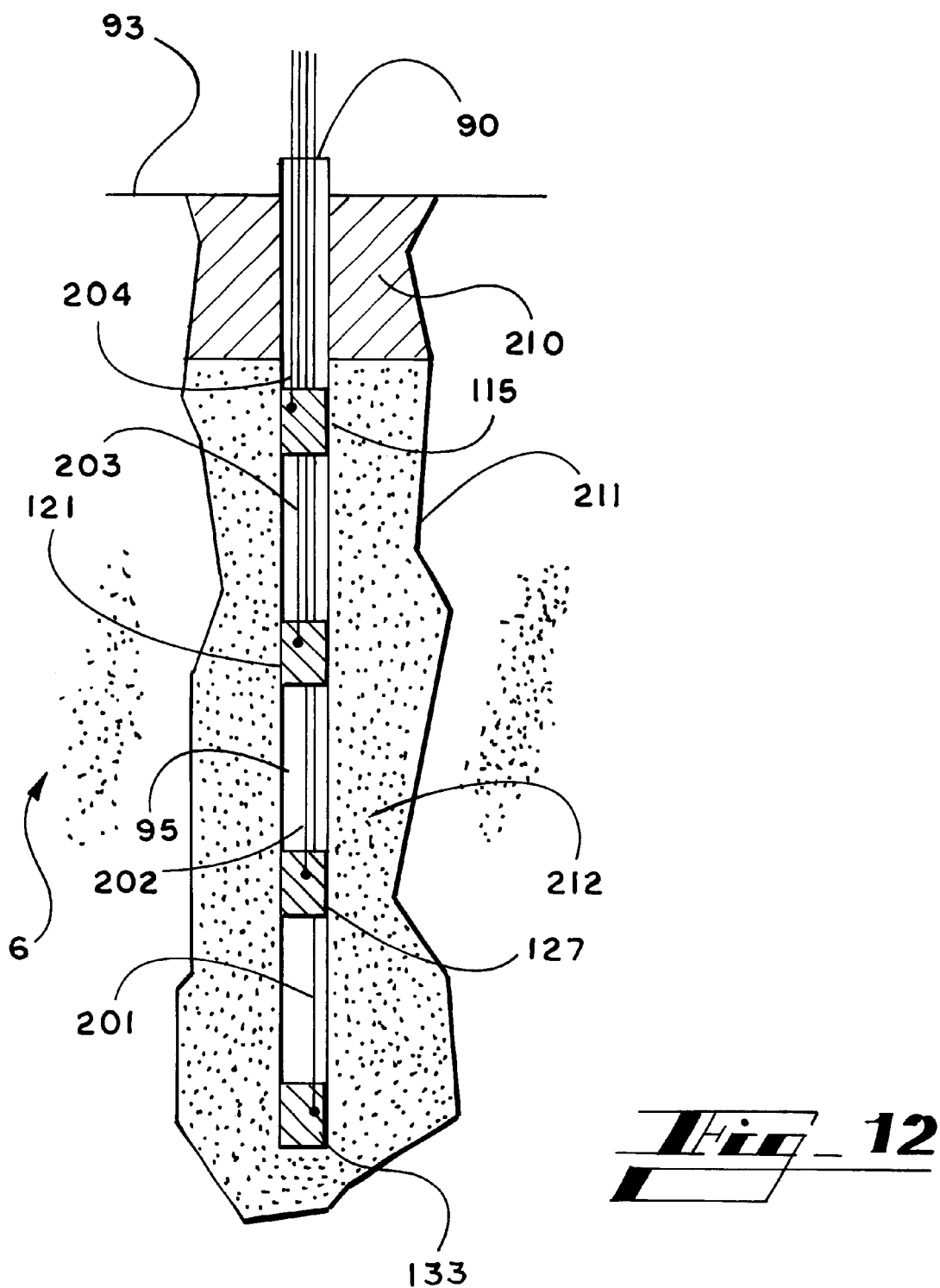
FIG. 12 is a cross-sectional side view of a single resistivity array showing the locations of individual resistivity receivers.

After initiation of the azimuth controlled vertical fracture and in order to determine when the fracture has achieved the desired in situ geometry, real time active resistivity tracking methods or a conventional tiltmeter tracking method can be employed. Referring to FIGS. 10, 11, and 12, a real time active resistivity tracking method and apparatus is shown. In FIG. 10, an individual injection casing 91 is shown in a top plan view. In most applications multiple injection casings 91 would be required to employ a real time tracking method. Generally, vertical arrays 90 of resistivity receivers 115, 121, 127, 133, as shown in FIG. 12, are located parallel to fracture plane 92 of the planned azimuth controlled vertical fracture, but offset on either one or both sides are the locations of the vertical arrays 90 of resistivity receivers 115, 121, 127, 133.

Referring to FIG. 11, six resistivity receiver arrays 90 are illustrated in a sectional view from FIG. 10. Each array 90 comprises a plurality of individual receivers 110–133 vertically connected as shown in FIG. 12 and spaced at depths parallel to the bore hole 105. The injection casing 91 along with the winged initiation section 107 is shown offset and parallel to the connecting plane 92 of the vertical resistivity arrays 90 for clarity. As shown in FIG. 12, the insulated conductors 201, 202, 203, 204 for each individual resistivity receiver 115, 121, 127, 133 are connected to a data acquisition system 102 seen in FIG. 11. The data acquisition system 102 is comprised of a multi-channel electronic switching system (multiplexer), an analog to digital converter (A to D), and a storage device that stores the incoming data. The data acquisition system 102 is coupled to a computer 103 where incoming data is analyzed by an installed software program.

Referring to FIG. 12, the vertical array 90 of resistivity receivers 115, 121, 127, 133 is installed in conventional bore holes 211. Typically, the vertical array 90 of resistivity receivers 115, 121, 127, 133 is constructed of a plurality of individual resistivity receivers 115, 121, 127, 133. Each resistivity receiver 115, 121, 127, 133 is manufactured from an electrically conductive metal, usually copper, and each resistivity receiver 115, 121, 127, 133 is attached to an insulated conductor 201, 202, 203, 204 which are routed through a nonconductive pipe or tubing 95 to the ground surface 93. The individual resistivity receivers 115, 121, 127, 133 are spaced as required and attached to the nonconductive pipe or tubing 95. The annular space between the bore hole 211 and the vertical array 90 of resistivity receivers 115, 121, 127, 133 is backfilled with clean sand 212 to a level above the uppermost individual resistivity receiver 115. The remainder of the bore hole 211 is backfilled with a surface seal 210 comprising bentonite clay or a non-shrink or low shrink cement based grout.

Using influence functions such as Green's functions, the computer software program can relate incremental measurements of the earth's induced voltage to the geometry change of an electrically energized initiated fracture. A series of sequential incremental solutions from the influence functions can be used to create an inverse model. The geometry of the fracture can be calculated during the injection process by solving the series of influence functions incorporated into the inverse model. Utilizing measured induced voltages from electrifying the fracture fluid 20, the user can monitor the injected flow of the fracture fluid 20 to determine and control the in situ geometry of the fracture during the injection process.

The computer 103 displays an image of the initiated and propagating fracture in real time. Control of the pumping system/operation 104 can be accomplished by data input from the computer 103.

To generate the data, a high frequency low voltage electrical supply 134 is attached to the injection casing 91 which can be either electrically conductive or connected to an electrically conductive electrode. The electrically conductive electrode can be placed inside the injection casing 91 so that the fracture fluid 20 when pumped into the injection casing 91 by the pumping system/operation 104 will receive and conduct the electrical voltage. That is, the fracture fluid 20 will become energized by the electrical voltage. A reference ground electrode 109 is driven into the ground surface 93 as far as practical from the vertical arrays 90 and the individual resistivity receivers 110–133. The reference ground can be, without limitation, a subsurface electrode or a neighboring initiated fracture. Before the azimuth controlled vertical fracture is initiated, the injection casing 91 is electrified. The voltages from the injection casing 91 to the reference ground electrode 109, and from the resistivity receivers 110–133 to the reference ground electrode 109 are measured, stored, and displayed by the data acquisition system 102 and computer and integrated software 103. The measured voltages are then used as background.

Referring to FIGS. 15 and 16, a visual display showing the locations of the individual resistivity receivers 200 within a ground formation is illustrated. In FIG. 16, two bore holes 205, 210 are shown within the arrangement of the individual resistivity receivers 200. The voltages of the individual resistivity receivers 200 are measured against the background reference voltages, and a visual display of a propagating azimuth controlled vertical fracture in the subsurface is shown.

Finally, it will be understood that the preferred embodiment has been disclosed by way of example, and that other modifications may occur to those skilled in the art without departing from the scope and spirit of the appended claims.

What is claimed is:

1. A method for constructing subsurface structures oriented at a predetermined azimuth in a formation of unconsolidated and weakly cemented soil and sediments, comprising:

drilling a bore hole with an axis in the formation of unconsolidated and weakly cemented soil and sediments to a predetermined depth;

installing an injection casing with an outer surface in the bore hole at the predetermined depth, wherein an annular space exists between the outer surface of the casing and the bore hole;

filling the annular space with a grout that bonds to the outer surface of the casing;

weakening the injection casing along a vertical weakening line lying within a fracture plane, which fracture plane extends from the axis of the bore hole radially along the predetermined azimuth;

injecting a fracture fluid into the injection casing with a sufficient fracturing pressure to dilate the injection casing, the grout, and the formation and thereby initiate a vertical fracture in the formation at the weakening line;

controlling the fracture fluid based on a sequential incremental solution to determine incremental fracture geometry changes as the fracture is propagating; and forming a wall-like subsurface barrier layer with the propagating fracture fluid, wherein such barrier layer remains in place for the ongoing treatment or containment of a predetermined material permeating to the barrier layer through the formation of unconsolidated and weakly cemented soil and sediments.

2. The method of claim 1, wherein installing the injection casing comprises the following step:

installing an initiation section of the injection casing at a predetermined depth in the bore hole, wherein the initiation section is weakened along the weakening line so that the initiation section separates under the fracturing pressure, whereby the fracture fluid dilates the grout and the formation to initiate the fracture in the formation at the weakening line.

3. The method of claim 1, wherein the fracture fluid does not leak off into the formation from the fracture.

4. The method of claim 1, wherein the fracture fluid comprises a proppant, and the fracture fluid is able to carry the proppant of the fracture fluid at low flow velocities.

5. The method of claim 1, wherein the fracture fluid is clean breaking with minimal residue.

6. The method of claim 1, wherein the fracture fluid has a low friction coefficient.

7. The method of claim 1, wherein the fracture fluid comprises a water based guar gum gel.

8. The method of claim 1, wherein the fracture fluid comprises a bentonite cement slurry.

9. The method of claim 1, wherein the fracture fluid comprises a proppant to create a containment wall contained within the vertical fracture.

10. The method of claim 1, wherein the fracture fluid comprises a proppant to create a treatment barrier contained within the vertical fracture.

11. The method of claim 1, wherein the method further includes forming a plurality of bore holes with injection casings therein and creating a plurality of vertical fractures that interconnect.

12. The method of claim 11, wherein the fracture fluid comprises a proppant for creating a continuous containment wall contained within the interconnected plurality of vertical fractures.

13. The method of claim 11, wherein the fracture fluid comprises a proppant for creating a continuous treatment barrier contained within the interconnected plurality of vertical fractures.

14. The method of claim 1, wherein the injection of the fracture fluid is controlled based upon a sequential incremental solution to determine incremental fracture geometry changes as the fracture is propagating and based on the measured conductivity of the fracture fluid.

* * * * *